United States Patent [19]

Williams

[11] Patent Number: 4,779,950

[45] Date of Patent: Oct. 25, 1988

[54] CONNECTION APPARATUS FOR OPTICAL FIBERS

[75] Inventor: Russell H. Williams, Flemington, N.J.

[73] Assignee: Thomas & Betts Corporation, Bridgewater, N.J.

[21] Appl. No.: 596,477

[22] Filed: Apr. 3, 1984

[51] Int. Cl.[4] .............................................. G02B 6/38
[52] U.S. Cl. .............................. 350/96.21; 350/96.20
[58] Field of Search ............... 350/96.20, 96.21, 96.22, 350/96.23

[56] References Cited

U.S. PATENT DOCUMENTS 3,933,409 1/1976 Kloots ............................ 350/96.20
4,277,135 7/1981 Schrott et al. .................. 350/96.21

FOREIGN PATENT DOCUMENTS 1008657 2/1952 France .
107205A 8/1981 Japan .
1425264 2/1976 United Kingdom .

OTHER PUBLICATIONS

IBM Technical Disclosure Bulletin, vol. 22, No. 6, dated Nov. 1979, "Safety Closure for Fiber-Optic Devices", by Noel, et al.

Primary Examiner—William L. Sikes
Assistant Examiner—Robert E. Wise
Attorney, Agent, or Firm—Robert M. Rodrick; Salvatore J. Abbruzzese

[57] ABSTRACT

An optical fiber connection apparatus includes a pair of mating connector halves each accommodating at least one optical fiber. A plug half is insertable into a receptacle half to provide optical connection between the fibers therein. The receptacle portion includes a movable cover supported thereon. The cover is movable from a first position covering the receptale and thereby protecting the fiber therein to a second position opening the receptacle to allow for insertion of the plug. The cover is also movable to lock the plug into the receptacle.

3 Claims, 2 Drawing Sheets

CONNECTION APPARATUS FOR OPTICAL FIBERS

FIELD OF THE INVENTION

This invention relates generally to connectors for optical fibers and more particularly to a locking mechanism in a fiber optic connector which also serves as a cover.

BACKGROUND OF THE INVENTION

With the advent and continued use of fiber optic cable as a replacement for or in conjunction with traditional electrical cable, there is a need to provide adequate connection apparatuses for such cables. In addition to providing proper optical alignment, which is required for all optical devices, the connection apparatus should also provide for quick and easy connection and disconnection. As with electrical cable connection, the fibers are typically terminated in connectors which can be interconnected with other fiber optic connectors or optical devices.

A problem encountered, when terminating optical fibers in optical connectors, as opposed to terminating electrical conductors in electric connectors is that the end of an unconnected fiber after termination may be damaged by adverse environmental hazards. These hazards such as dust and dirt as well as external contact with the fiber, may impair the optical capabilities of the fiber. Thus it becomes desirable to protect the fiber ends prior to connection. Also detrimental to optical transmission, is the adverse effects of an external load impacted on the connector itself. The load can be transmitted through the connector to the fiber, causing damage thereto.

Devices are known which provide shutters, closures or other similar mechanisms for protecting the end of the terminated fibers. U.S. Pat. No. 4,277,135 shows a connector for plural optical fibers which includes a cover to close the apertured end of the connector and protect the fibers therein. Also, U.S. patent application Ser. No. 332,716 filed Dec. 21, 1981, now abandoned and assigned to the assignee of the present invention, discloses an optical fiber connector including a cover or shutter for closing the apertured end of the connector. While each of these connection apparatuses efficiently provides for a closure which protects the end of the fiber, a separate connection mechanism is usually needed to couple one optical connector to another. Typically, these coupling mechanisms are in the form of latches or screw-threaded parts which securely and rigidly fasten one connector half to the other. Thus it can be appreciated that any load placed on one connector half will be transmitted to the other connector half and to the fibers therein.

SUMMARY OF THE INVENTION

It is an object of the present invention to provide an optical fiber connector including a cover for closing the optical accessing opening prior to connection.

It is a further object to provide an interconnection apparatus for optical fibers including a plug and receptacle wherein the plug is inserted into the receptacle to provide optical connection. The receptacle includes a cover which closes the accessing aperture of the receptacle in the disconnected position and locks the plug into the receptacle in connected position.

These and other objects are achieved in the preferred embodiment of the present invention which includes a connector for an optical fiber comprising a housing for accommodating the fiber. The housing includes a channel therein and an aperture in communication with the channel for accessing the fiber. A cover is movably supported on the housing for movement from a first position closing the aperture to a second position providing access to the channel for an optical device for connection to the housing. The cover is also movable to lock the optical device in connection position in the housing.

DETAILED DESCRIPTION OF THE PREFERRED EMBODIMENTS

Figure 1:
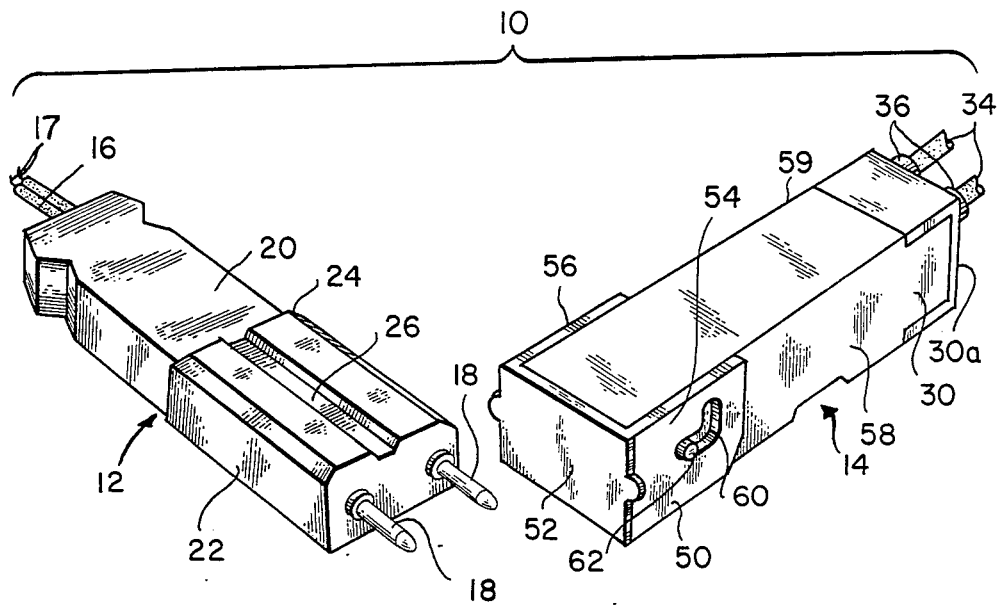
FIG. 1 shows in perspective, the mating halves of the fiber optic connection apparatus of the present invention, in disconnected position.
Figure 2:
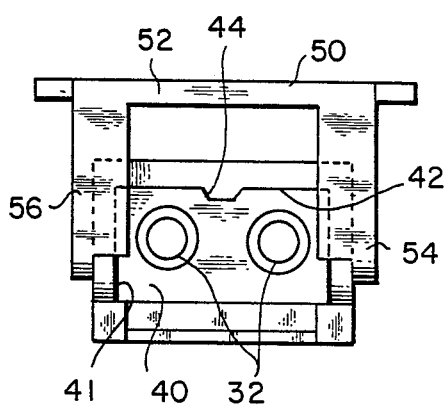
FIG. 2 shows in front view the receptacle of the apparatus of FIG. 1, with the cover in the open position.
Figure 3:
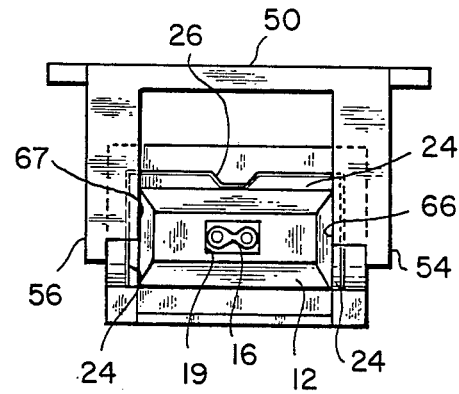
FIG. 3 shows the receptacle of FIG. 2 with the mounting plug inserted therein and the cover in the partially closed position.

Referring to FIGS. 1-3, the optical fiber connection apparatus 10 of the present invention may be described. Connection apparatus 10 includes a fiber optic cable termination plug 12 and a mating fiber optic termination receptacle 14. Plug 12, shown in the left portion of FIG. 1, is a generally elongate, rectangular member which accommodates therein a duplex fiber optic cable 16 including a pair of optical fibers 17. Each of the two fibers 17 of cable 16 is supported in a fiber ferrule 18 which extends beyond the forward wall 12a of plug 12. Ferrule 18 is of conventional construction and supports the end of fiber 17 for optical connection.

In preferred form, plug 12 is a two piece member and as shown in FIG. 1 includes a rearward cable accommodating portion 20 and a forward insertion portion 22. The cable accommodating portion 20 is insertably and retentively received in the insertion portion 22. The two piece construction of the plug 12 while disassembled facilitates termination of the fibers 17 in ferrules 18 and mounting of ferrules 18 in insertion portion 22. A central bore 19 (FIG. 3) in the cable accommodating portion 20 supports the duplex cable. The twin fibers 17 are split from each other and are individually supported in ferrules 18 housed in insertion portion 22. Insertion portion 22 has a transverse extent which is greater than the transverse extent of cable accommodating portion 20. A lip 24 (FIG. 3) is provided by this wider portion, partially peremetrically around cable accommodating portion 20 at the juncture therebetween. Lip 24, as will be described in greater detail hereinafter, forms a stop surface prohibiting withdrawal of the plug 12 from receptacle 14. Insertion portion 22 further includes a longitudinally extending groove 26 which is trapezoidal in shape and is adapted to be keyed to a mating rib of receptacle 14 which also will be described more fully hereinbelow.

Referring again to FIGS. 1 and 2, the receptacle 14 of connection apparatus 10 may be described. Receptacle 14 is an elongate, generally rectangular member having a fiber accommodating end portion 30. End portion 30 includes a pair of openings 32 which extend through rear wall 30a of end portion 30 and which accommodate a pair of optical cables 34. FIG. 1 shows a pair of separate optical cables 34 being mounted in receptacle 14, however it is also contemplated that a duplex cable or any other form of optical cable may also be used in connection with the present invention. The cables 34 are terminated in ferrules 36 which are mounted in openings 32. Receptacle 14 further includes a central channel 40 extending therein in communication with openings 32. The channel 40 is also in communication with a tranverse rectangular opening 41 forming the front face of receptacle 14 providing access for plug 12. Channel 40 and opening 41 are dimensioned to slidably receive insertion portion 22 of plug 12. When properly positioned ferrules 36 of receptacle 14 are aligned with ferrules 18 of plug 12 placing the fibers 17 and 34 in position for optical transmission therebetween. As seen in FIGS. 2 and 3, an upper internal wall 42 of receptacle 14 includes a longitudinally extending, centrally disposed rib 44 which is generally trapezoidal in shape. Rib 44 mates with groove 26 of plug 12 upon insertion of plug 12 into receptacle 14 to provide a keyed engagement therebetween. The rib 44 and groove 26 further provide a polarization feature to assure proper orientation of plug 12 in receptacle 14. In typical optical transmissions, one fiber path 17–36 is used for sending and the other path 17–36 is used for receiving. Thus polarization of the plug 12 and receptacle 14 is desired.

Upon full insertion of plug 12 into receptacle 14 the lip 24 between insertion portion 22 and cable accommodating portion 20 is flush with the transverse opening 41 at the front face of receptacle 14. It is further contemplated that instead of fixedly securing ferrules 18 and 36 to plug 12 and receptacle 14, ferrules 18 and 36 may alternatively be spring loaded into the plug 12 and receptacle 14 respectively causing the plug 12 and receptacle 14 to be urged together against the bias of the springs (not shown). Thus upon insertion of plug 12 in receptacle 14 the insertion portion 22 of plug 12, may extend slightly outwardly of the receptacle 14, against the bias of the spring loaded ferrules. A cover 50, described more fully hereinbelow, supported on receptacle 14 is used to urge the plug 12 inward against the bias of the springs of the ferrule 18 and 36 and hold the plug 12 in a spring loaded position in receptacle 14.

Cover 50 is movably supported adjacent the front end of receptacle 14 and has a first flat cover surface 52 which in the closed position as shown in FIG. 1 closes transverse aperture 41 of receptacle 14. Cover 50 further includes a pair of spaced mounting surfaces 54 and 56 which extend normally from cover surface 52 and contact the longitudinal side walls 58 and 59 of receptacle 14. Each of mounting surfaces 54 and 56 includes an L-shaped guideway 60 therethrough. Guideway 60 movably supports cover 50 on receptacle 14. A pair of projections 62 extend from side walls 58 and 59 of receptacle 14 and lie in the guideway 60. It can be seen that the cover 50 is movable with respect to receptacle 14, with the guideways 60 and projection 62 limiting the extent of such movement.

Figure 4:
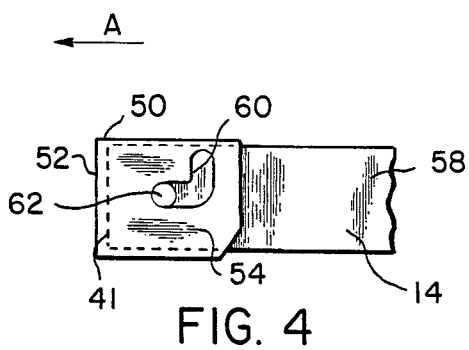
FIGS. 4 through 6 show, in schematic view the closed, open and locked positions respectively of the cover of the present invention.
Figure 5:
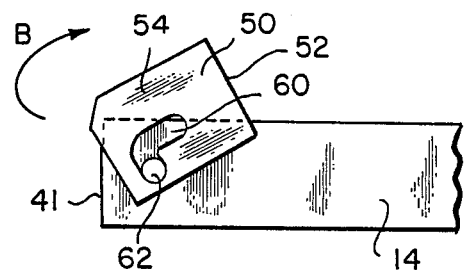
Figure 6:
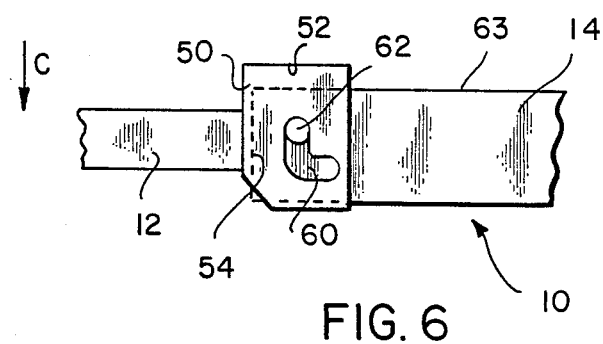

Shown schematically in FIGS. 4 through 6 are the various positions through which cover 50 moves. FIG. 4, shows the closed position of cover 50. In this position, the cover surface 52 lies in front of opening 41 of receptacle 14. The mounting surfaces 54 and 56 lie substantially parallel to the side walls 58 and 59 of receptacle 14. The cover 50 is positioned such that guideway 60 engages projection 62 at an extreme extent of one leg of the L forming the guideway 60. In this position aperture 41 is closed. Dirt and debris are prevented from entering channel 40 and thus contacting the fibers 36. Also, inadvertent contact with the fibers 36 is prevented.

The cover 50 is then movable to an open position shown in FIG. 5. The cover is moved forward in the direction of arrow A in FIG. 4 until the projection 62 lies in the vertex of the L-shaped guideway and then is pivotally rotated in the direction of arrow B (FIG. 5). The projection 62 now lies in an extreme extent of the other leg of the L-shaped guideway. Cover surface 52 is now clear of aperture 41 and plug 12 may be freely inserted into receptacle 14.

Once inserted, plug 12 can be locked in position in receptacle 14 by further movement of cover 50. Referring to FIGS. 3 and 6, cover 50 is pivotally rotated forward to a position wherein the mounting surfaces 54 and 56 are substantially perpendicular to the longitudinal extent of receptacle 14 (FIG. 3). In this position the projections 62 are in the vertex of the L-shaped guideways 60.

In this position the cover 50 also retentively secures plug 12 in receptacle 14. Each cover mounting surface 54 and 56 further includes an inwardly projecting edge 66 and 67 respectively which extends partially across, transverse aperture 41 (FIG. 3). Projecting edges 66 and 67 extend inwardly across aperture 41 approximately the width of lip 24 of plug 12. Thus, upon insertion of plug 12 into receptacle 14 and movement of cover 50 to the position shown in FIG. 3, the extending edges 66 and 67 will slide over and abut against the stop surface formed by lip 24 and prohibit withdrawal of plug 12 from receptacle 14. Thus, plug 12 will be locked into position in receptacle 14.

It is also contemplated that with the use of a spring loaded plug 12 as described hereinabove, the movement of cover 50 to the position shown in FIG. 3 will act as a cam, pushing the extending part of insertion portion 22 further into receptacle 14 and thus urging the plug 12 against the bias of the springs of ferrules 18 and 36. The cover 50 will also hold plug 12 in this spring loaded position.

After rotation to the position shown in FIG. 3, cover 50 is then moved downwardly as shown by arrow C in FIG. 6, to the fully locked position. The cover surface 52 will lie substantially against the upper surface 63 of receptacle 14, presenting a low profile for the connection apparatus 10. The plug 12 is securely locked in receptacle 14 and cannot be pulled out without rotation of cover 50 to its open position (FIG. 5).

A further feature of the present invention is now described with reference to the drawings. As the components of the instant invention are formed of a moderately flexible plastic material such as NORYL resin, the cover mounting surfaces 54 and 56 are moderately elastic. Thus, these mounting surfaces deflect in order to place the cover 50 in proper position on the receptacle 14, the deflection being necessary to allow the mounting surfaces 54 and 56 to pass over projections 62. However this resiliency also serves to prevent the force of an external impact on the plug 12 from being transmitted to the receptacle 14 and thus to fibers 34 supported therein. As the cover 50 bears against the plug 12 in receptacle 14, any load impacted upon the plug 12, such as a lateral load, will twist the plug 12. This twisting will exert a force against the cover 50. Since the mounting surfaces 54 and 56 are elastically secured to the longitudinal sides of the receptacle 14, the cover will have a tendency to disengage from its securement to receptacle 14. Once the cover is disengaged, the plug 12 will not be held in the receptacle and will dislodge therefrom. Thus the force of the impact will not be transmitted to the receptacle 14 and thereby to the fibers 34. It is further contemplated that as the mounting surfaces 54 and 56 of cover 50 are relatively thin, they may break or shear upon impact thus disconnecting plug 12 from receptacle 14 and prevent damage thereto. This frangible construction of cover 50 results in damages to the cover 50 rather than to the fibers 34. The frangible cover 50 may then be replaced by another cover and the connection assembly can be used again.

Various other modifications to the foregoing disclosed embodiment will be evident to those skilled in the art. Thus, the particularly described preferred embodiment is intended to be illustrative and not limited thereto. The true scope of the invention is set forth in the following claims.

I claim:

1. A connection apparatus for mechanically and optically connecting optical cables comprising:
   an elongate receptacle including a first end for accommodating a first optical cable, an open second end and a pair of side walls between said first and second ends defining a channel for interconnection access to said receptacle, each said side wall further including a projection extending therefrom, adjacent said open second end;
   an elongate plug including a first end for accommodating a second optical cable and a second end being insertable into said channel of said receptacle to place said first and second cables in optical connection;
   a cover moveably supported on said receptacle adjacent said open second end of said receptacle, said cover including a cover surface for covering said open second end of said receptacle and depending mounting surfaces each disposed in contact with one of said side walls of said receptacle, each mounting surface including an L-shaped guideway therein which accommodates one of said projections of said side walls of said receptacle for providing moveable support of said cover relative to said receptacle, said cover being moveable from a first position wherein said cover surface covers said open second end of said receptacle to a second position uncovering said open second end of said receptacle thereby rendering accessible said channel for optical connection of said first and second cables and further being moveable to a third position in locking engagement with said plug to thereby lock said plug in said channel of said receptacle, said cover being moveable among said three positions by movement of said cover along said L-shaped guideways about said projections, said mounting surfaces being formed of resiliently deformable material such that upon application of an external force to said plug when said cover is in said third position, said force is transferred to said mounting surfaces thereby causing resilient deformation of said mounting surfaces and disengagement of said projections from said guideways, placing said cover out of locking engagement with said plug.

2. A connection apparatus of claim 1 wherein each of said L-shaped guideways includes a first leg and a second leg each extending from a common vertex, said guideways being positioned in said first and third positions, with said projections disposed in said first leg and said guideways being positioned in said second position with said projections disposed in said second leg.

3. A connection apparatus of claim 1 wherein said cover is formed of frangible material.

* * * * *